United States Patent
Wei

(10) Patent No.: US 11,032,281 B2
(45) Date of Patent: Jun. 8, 2021

(54) METHOD AND SYSTEM FOR DIGITAL RIGHTS ENFORCEMENT

(71) Applicant: D2L CORPORATION, Kitchener (CA)

(72) Inventor: Erkang Wei, Kitchener (CA)

(73) Assignee: D2L Corporation, Kitchener (CA)

( * ) Notice: Subject to any disclaimer, the term of this patent is extended or adjusted under 35 U.S.C. 154(b) by 259 days.

(21) Appl. No.: 14/242,931

(22) Filed: Apr. 2, 2014

(65) Prior Publication Data

US 2015/0288692 A1 Oct. 8, 2015

(51) Int. Cl.
- G06F 7/04 (2006.01)
- G06F 17/30 (2006.01)
- H04N 7/16 (2011.01)
- H04L 29/06 (2006.01)
- H04L 29/08 (2006.01)

(52) U.S. Cl.
CPC .............. *H04L 63/10* (2013.01); *H04L 67/04* (2013.01); *H04L 67/10* (2013.01); *H04L 67/20* (2013.01); *H04L 67/32* (2013.01)

(58) Field of Classification Search
CPC .................. G06F 21/10; H04L 2209/60; H04L 2209/603; H04L 63/10; H04L 67/32; H04L 67/26; H04L 67/04; H04L 67/10; H04L 67/20; H04N 21/25; H04N 21/2541; H04N 21/40; H04N 21/4126
See application file for complete search history.

(56) References Cited

U.S. PATENT DOCUMENTS

| | | | | |
|---|---|---|---|---|
| 2006/0253887 | A1* | 11/2006 | Greene | H04N 7/17309 725/118 |
| 2007/0100829 | A1* | 5/2007 | Allen | G06F 17/3089 |
| 2008/0148363 | A1* | 6/2008 | Gilder et al. | 726/4 |
| 2008/0195546 | A1* | 8/2008 | Lilley | G06F 21/10 705/59 |
| 2010/0242097 | A1* | 9/2010 | Hotes et al. | 726/4 |
| 2010/0250917 | A1* | 9/2010 | Marivoet et al. | 713/150 |
| 2011/0225417 | A1* | 9/2011 | Maharajh et al. | 713/150 |
| 2014/0013450 | A1* | 1/2014 | Parry et al. | 726/29 |
| 2014/0156373 | A1* | 6/2014 | Roberts | H04L 67/10 705/14.35 |
| 2014/0344571 | A1* | 11/2014 | Adam et al. | 713/165 |
| 2015/0020149 | A1* | 1/2015 | Dinsmore et al. | 726/1 |

* cited by examiner

*Primary Examiner* — Amie C. Lin
(74) *Attorney, Agent, or Firm* — Gowling WLG (Canada) LLP; Neil W. Henderson

(57) ABSTRACT

There is provided a method and system for digital rights enforcement. The method includes: determining digital content requested by a user via a selected user device; determining digital rights associated with the digital content; reviewing the digital rights to determine access rights relating to authorized devices for the user; determining whether the user has exhausted the access rights; and if the access rights are exhausted: determining at least one use factor for each of the user's previously authorized user devices; determining a previously authorized user device on which to revoke access to the digital content based on the at least one use factor; and revoking access rights to the previously authorized user associated device; otherwise downloading the digital content on the selected user device. The system includes a content review module and a revoker module.

25 Claims, 5 Drawing Sheets

METHOD AND SYSTEM FOR DIGITAL RIGHTS ENFORCEMENT

FIELD

The present disclosure relates generally to digital rights. More particularly, the present disclosure relates to a method and system for digital rights enforcement over a plurality of user devices.

BACKGROUND

Digital content is often protected by associated digital rights, for example, Digital Right Management (DRM) data. DRM is a class of access control technologies that are used with the intent to limit the use of digital content after the sale or distribution of the digital content. DRM describes any technology that inhibits the use of digital content in a manner not intended by the content provider.

According to the related art, on the purchase of digital content, DRM is associated with the digital content or a device in which to review the digital content. For example, a compact disc or Blu-ray™ disc may have a region code associated with the content which only allows players associated with that region code to play the disc. In another example, when downloading an electronic book (e-book), a user may be requested to specify the device which is to receive the content. Only on manipulation of the digital content is the user aware that the rights are limited. Issues can occur when digital content is purchased via an online purchase and the user has multiple devices that are able to display the digital content, yet the user is limited to using the digital content only on the original device that was associated with the purchased digital content.

It is, therefore, desirable to provide a method and system for digital rights management enforcement that mitigates at least one disadvantage of previous systems.

The above information is presented as background information only to assist with an understanding of the present disclosure. No determination has been made, and no assertion is made, as to whether any of the above might be applicable as prior art with regard to the present disclosure.

SUMMARY

In a first aspect, the present disclosure provides a method for digital rights enforcement over multiple devices, the method including: determining digital content requested by a user via a selected user device; determining digital rights associated with the digital content; determining access rights relating to authorized devices for the user based at least in part on the digital rights associated with the digital content; determining whether the user has exhausted the access rights; and if the access rights are exhausted: determining at least one use factor for each of the user's previously authorized user devices; determining a previously authorized user device on which to revoke access to the digital content based on the at least one use factor; and revoking access rights to the previously authorized user associated device; otherwise downloading the digital content on the selected user device.

In a particular case, the revoking of the access rights to the previously authorized user device may occur automatically.

In another particular case, the user may be requested to approve the selection of which previously authorized user associated device to revoke prior to the revoking of the access rights.

In still another particular case, one or more of the at least one use factor may be selected from the group of: time the digital content was downloaded on the user device; last access of the digital content on the user device; time spent using the digital content on the user device; and frequency of accessing the digital content on the user device.

In yet another particular case, the method may include determining a number of concurrent downloads requested by the user after determining the digital content requested by the user; and if the number of concurrent downloads is above a predetermined threshold, waiting for a preset condition to be satisfied before proceeding. In this case, the preset condition may be the expiry of a predetermined time interval.

In still yet another particular case, the method may include encrypting the digital content prior to downloading the digital content on the selected user device.

In still another case, the encrypting of the digital content occurs contemporaneous to the request for the digital content.

In a particular case, the method may include displaying a catalogue of available digital content to the user prior to determining the digital content requested by the user.

In another particular case, the displaying of the catalogue may include: determining user data related to the user; and determining catalogue content from a learning management system based on the user data.

In still another particular case, the revoking of the access rights may include deleting the digital content from the previously authorized user device.

In yet another particular case, the revoking of the access rights may include deleting a decryption key from the previously authorized user device.

In still yet another particular case, the revoking access rights may include: monitoring for connection of the previously authorized user device to a network; and sending a signal revoking the access rights of the previously authorized user device to the previously authorized user device to revoke the digital content.

In a particular case, the method may include determining a user identification; and determining access rights relating to authorized devices for the user based at least in part on the user identification.

In another particular case, the user identification identifies the user as either a student or instructor and the determining of the access rights relating to authorized devices further comprises determine a course related to the digital content.

In a further embodiment there is provided a system for digital rights enforcement over multiple devices, the system including: a content review module configured to: determine digital content requested by a user via a selected user device; and determine digital rights associated with the digital content; and an revoker module configured to: to determine access rights relating to authorized devices for the user based at least in part on the digital rights associated with the digital content; determine whether the user has exhausted the access rights; and if the access rights are exhausted: determine at least one use factor for each of the user's previously authorized user devices; determine which previously authorized user device on which to revoke access to the digital content based on the at least one use factor; and send a revoke message to revoke the access rights to the previously authorized user device; otherwise allow the download of the digital content on the selected user device.

In a particular case, the system may include an enforcement module configured to revoke the access rights on the previously authorized user device.

In another particular case, the revoker module may be further configure to provide a prompt to the user wherein the user is requested to approve the selection of which previously authorized user device to revoke prior to the revoking of the access rights.

In still another particular case, one or more of the at least one use factor may be selected from the group of: time the digital content was downloaded on the user device; last access of the digital content on the user device; time spent using the digital content on the user device; and frequency of accessing the digital content on the user device.

In yet another particular case, the content review module may be further configured to: determine a number of concurrent downloads requested by the user after determining the digital content requested by the user; and if the number of concurrent downloads is above a predetermined threshold, wait a predetermined time interval before proceeding.

In still yet another particular case, the content review module may be further configured to: encrypt the digital content prior to downloading the digital content on the selected user device.

In a particular case, the system may include a display module configured to display a catalogue of available digital content to the user.

In another particular case, the enforcement module may be configured to revoke the access rights by deleting the digital content from the previously authorized user device.

In still another particular case, the enforcement module may be configured to revoke the access rights by deleting a decryption key from the previously authorized user device.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

The following description with reference to the accompanying drawings is provided to assist in a comprehensive understanding of example embodiments of the system and method as defined by the claims and their equivalents. The following description includes various specific details to assist in that understanding but these are to be regarded as merely exemplary. Accordingly, those of ordinary skill in the art will recognize that various changes and modifications of the embodiments described herein can be made without departing from the scope and spirit of the invention as defined by the claims. In addition, descriptions of well-known functions and constructions may be omitted for clarity and conciseness.

The terms and words used in the following description and claims are not limited to the bibliographical meanings, but, are merely used by the inventor to enable a clear and consistent understanding of the embodiments of the method and system described herein. Accordingly, it should be apparent to those skilled in the art that the following description of example embodiments is provided for illustration purpose only and not for the purpose of limiting the invention as defined by the appended claims and their equivalents.

Generally, the present disclosure provides a method and system for digital rights enforcement on a plurality of devices. In particular, the embodiments of the system and method detailed herein provide for the digital rights, for example the Digital Rights Management (DRM) information, to be enforced on a plurality of devices associated with a user. Further, the system and method provide for revoking access to digital content from a device if the user wishes to load the digital content on another device but has reached a maximum number of authorized devices. In some cases, the device from which the access to digital content is revoked is selected based on at least one use factor including, for example, time since digital content was downloaded, time since last content was last reviewed, time content was reviewed on device, and the like.

Control over digital content is increasingly important as users accept and adapt to new forms of media. Users are able to access digital content (which is generally covered by copyright and sometimes referred to as copyright content) through a variety of computing devices, for example, electronic books or readers, tablet computers, smart phones, netbooks, laptops, and the like. Users may have access to a plurality of computing devices and may wish to view electronic content on each of the plurality of computing devices depending on the situation of each user.

Figure 1:
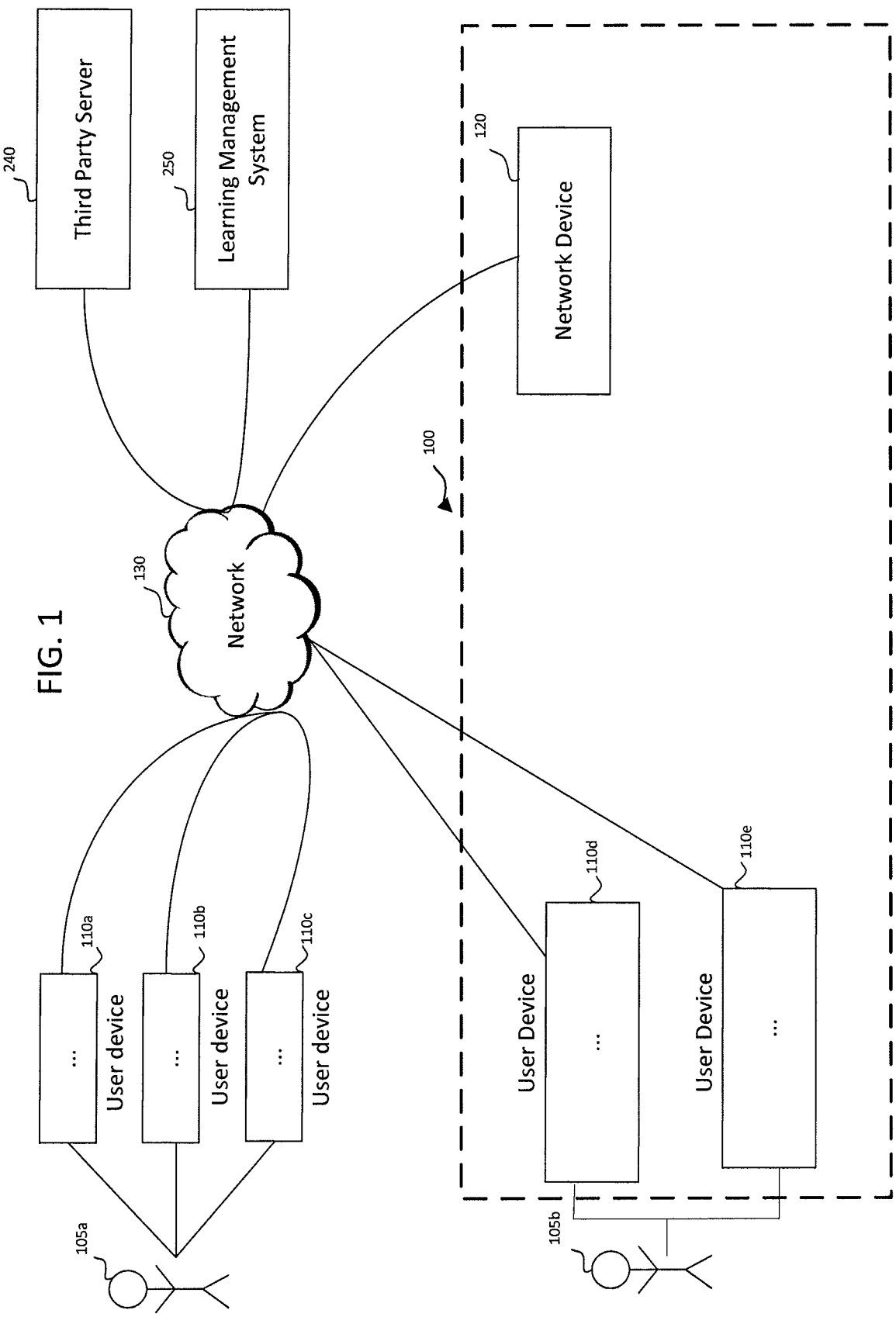
FIG. 1 illustrates a system for digital rights management enforcement for a plurality of devices according to an example embodiment.

FIG. 1 illustrates a system 100 for digital rights enforcement for a plurality of user devices according to an example embodiment. Referring to FIG. 1, the system 100 may include at least one user device 110, and a network device 120 and is operatively connected to a network 130, a third party server 240 and a learning management system 250.

At least one user 105a, via at least one user device 110a-110c, accesses the network device 120 via the network 130. Another user 105b, may also access the network device 120 via at least one user device 110d-110e. The user devices 110a-110e may be, for example, an electronic book, an electronic reader, a tablet computer, a smart phone, a laptop, a desktop, a gaming console (handheld or stationary), or the like. The network device 120 may be a separate computing device configured to transmit and receive data related to one or more services or applications that run on one or more user devices 110. The network device 120 may be a stand-alone device or an arrangement of two or more devices working in conjunction with each other. In some cases, the network device 120 may be a component or a module of the learning management system 250. The network 130 may be the Internet, a Local Area Network (LAN), a Wide Area Network (WAN), a Personal Area Network (PAN), an enterprise network, a Virtual Private Network (VPN), or the like. The third party server 240, may be, for example, a web server, a Google™ drive, a server of Amazon™ cloud services, or the like.

Figure 2:
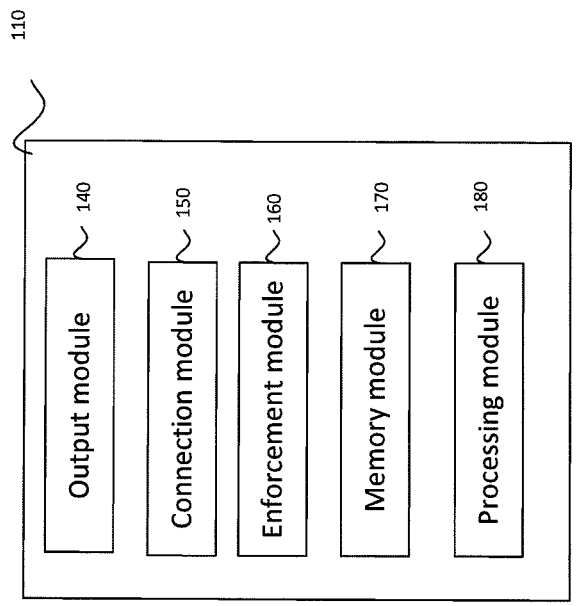
FIG. 2 illustrates an embodiment of a user device for a system for digital rights management enforcement for a plurality of devices.

FIG. 2 illustrates the user device 110 according to an example embodiment. The user device 110 includes an output module 140, a connection module 150, an enforcement module 160, a memory module 170 and a processing module 180.

The user 105 accesses the system via a user device 110. Each user device 110 includes, for example, the output module 140 configured to display digital content to the user 105. It will be understood that other forms of output may also be anticipated, such as audio output, and the like but for the purposes of this embodiment reference is made to a display. The display may also be configured to receive input from the user, for example a touch screen, or the user device may have alternative input components. Each user device 110 may have network capabilities via, for example, the connection module 150. The connection module may be configured to receive communication from and transmit communication to the network device 120, the learning management system 250, and third party servers 240, typically via the network 130.

The user device 110 further includes the enforcement module 160 which is configured to retrieve and enforce the digital rights, such as the DRM, associated with the digital content. The user device includes the processing module 180 configured to execute instructions received from the system 100 and the memory module 170, for example, a database for storing, for example, digital content, DRM, use factors, or the like.

When the user 105 requests digital content, for example, an electronic book, a game, a video, an image, an audio recording, or the like, the user device 110 transmits the request via the connection module 150 to the network device 120.

Figure 3:
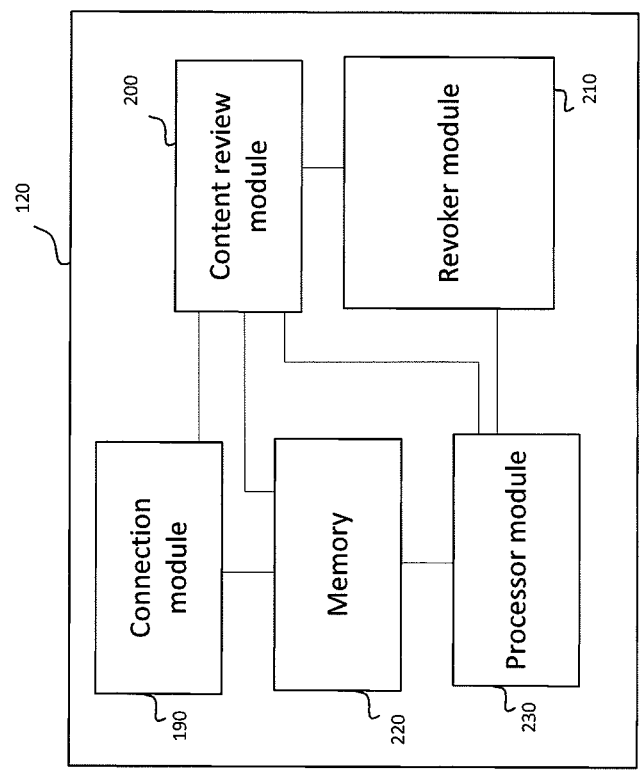
FIG. 3 illustrates an embodiment of a network device for a system for digital rights management enforcement for a plurality of devices

FIG. 3 illustrates the network device 120 according to an example embodiment. The network device may include a connection module 190, a content review module 200, a revoker module 210, a memory module 220 and a processor module 230.

The connection module 190 of the network device 120 receives the request from the user device 110 and may transmit the request for digital content to the processor module 230 for processing. The content review module 200 is configured to retrieve the digital content requested by the user. The content review module 200 is further configured to determine the DRM associated with the requested digital content. In some cases, the DRM may be stored in the memory module 220.

The content review module 200 is configured to retrieve the digital content associated with or requested by the user 105a accessing the system 100. The content review module 200 is further configured to determine the DRM based on the digital content selected by the user 105 or any specific DRM that may be associated with the user 105 accessing the digital content. In some cases, the content review module may determine the user's identification, for example the user may be identified as a student, teacher, administrator, publisher, author, or the like, and only specific digital content may be available to the user and the content may vary depending on the user's role. In an example, a student user may only have access to an ebook (the digital content) for a limited number of days, for example, 2 days, 90 days, 180 days or the like, while a separate instructor user may have access to the ebook for an unlimited number of days. Further, the student user may be limited in the amount of text the student has access to copy, while the instructor user may have unlimited amount or have a higher limit in the amount of text the instructor has access to copy.

In some cases, the content review module 200 is configured to query the learning management system 250 to determine user data, for example, role of the user, courses associated with the user, course dates for enrolled courses, and the like. The content review module 200 may be further configured to query third party servers, such as third party server 240, to determine the digital content requested by the user and/or the DRM associated with the digital content.

The revoker module 210 is configured to retrieve the DRM associated access rights for the user. In some cases, the DRM will provide the revoker module 210 with the number of authorized devices for the user with respect to the requested digital content, for example, the number of copies or devices allowed to host and/or store the digital content at a given period in time. The revoker module 210 is further configured to determine the previously authorized user devices which have previously downloaded the content and on which the content remains active and accessible to the user. If downloading the additional copy of the digital content requested by the user 105 will give the user access to more than the maximum number of authorized devices allowed, the revoker module 210 will revoke at least one previously authorized device by, for example, disabling or removing the digital content on the previously authorized device. In some case, the revoker module 210 reviews at least one use factor to determine which user device 110 should be revoked, and sends a revoke message to the user device 110. In other cases, the revoker module 210 reviews a plurality of use factors to determine which user device the user is least likely to require use of the digital content and send a revoke message to that user device. In still other cases, the revoker module 210 may request user input to determine which user device 110 should be revoked prior to revoking the user device, for example, by presenting a list of user devices having the content and allowing a selection of the device to be revoked.

The memory module 220 may be a database within the network device 120, or may be operatively connected to the network device 120. The memory module 220 may be operatively connected to the content review module 200 and the revoker module 210 and may be configured to store user data, digital content, DRM, user data, use factors and the like. The network device 120 further includes a processing module 230 configured to execute the instructions and/or commands of the other modules. In some cases, the processing module 230 may be the central processing unit of the network device, in other cases, the processing module may be distributed and each module may include a separate processor.

Figure 4:
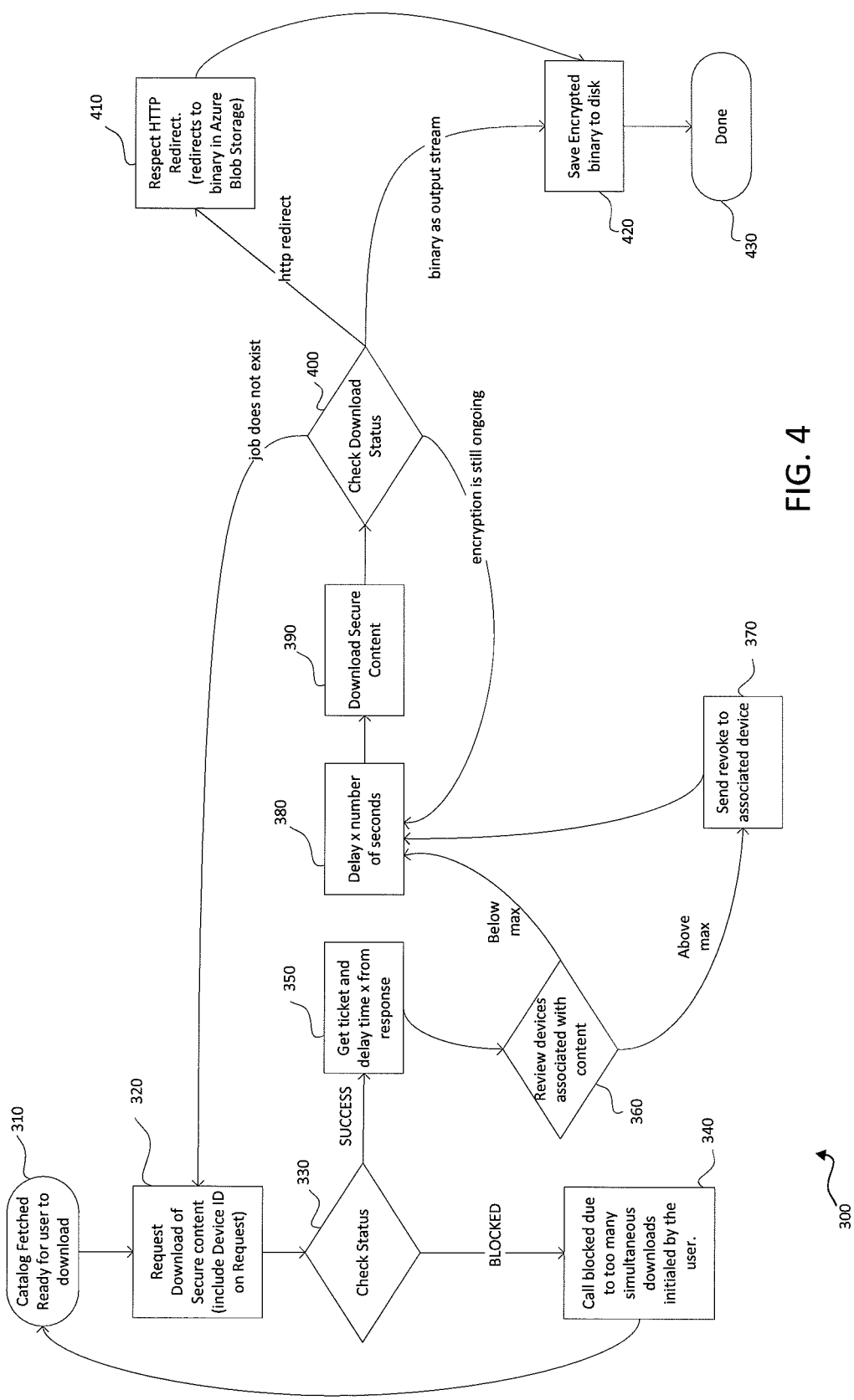
FIG. 4 is a flowchart illustrating a method for digital rights management enforcement for a plurality of devices according to an example embodiment.

FIG. 4 is a flowchart illustrating a method 300 for digital rights management enforcement for multiple devices according to an example embodiment.

At 310, the user 105b accesses the system 100 via the user device 110d. On accessing the system 100, the content review module 200 determines a catalogue of available digital content for the user 105b. The catalogue may be retrieved from the memory module 220 or may be derived by, for example, querying third party servers 240 and/or the learning management system 250 to determine the digital content the user 105b is authorized to download. In some cases, the user 105b may have the option of viewing a plurality of catalogues, for example, a catalogue of digital content already purchased by the user, a catalogue of digital content required for upcoming courses in which the user is enrolled, a catalogue of digital content that might interest the user based on past purchases, or the like.

Each user may have individualized catalogues based on the associated user data, for example, the user's role, the user's past behavior, the user's upcoming courses, or the like. The catalogue may provide detail to the user of the digital content available, the DRM associated with the content, the cost, and the like. The catalogue may further provide an input component, such as a link, a button, or the like, where the user can select specific digital content.

At 320, the user requests to download a selected digital content and the user device 110 transmits the request to an appropriate server hosting the content requested by the user. Once the request has been made, the user may be directed to a secure page in order to confirm the user id and login via a password or other confirmation technique. In some cases, the user may have already been authenticated via the network to a network device prior to requesting a download of a selected content. If the user is requesting to download digital content not previously purchased, the user may further be requested to enter payment details. In some cases, if the user is requesting to download digital content which has previously been purchased and downloaded by the user, the user may be requested to specify a user device to receive the digital content. In other cases, the user may be presented with a list of devices associated with the user, and the user can select a specific device. In still other cases, the system 100 will assume the content is to be downloaded on the user device the user is currently using to access the system 100.

At 330, the status of the user may be checked, for example by the network 120 device querying the user device 110, the processor module 230 of the network device querying the memory 220 if the status is stored by the network device 120, or the like. The status of the user is reviewed to determine the user's status with respect to ongoing downloads. The number of active user downloads is compared against a predetermined threshold. In some cases, the threshold may be manually entered by, for example, an administrator, a publisher, an author, a super user or the like of the system 100. In other cases, the threshold may be automatically configured based on the bandwidth capabilities of the user device requesting the download and the bandwidth available to the network device and/or third party server currently hosting the digital content. In some cases, the threshold may be limited to a small number of concurrent downloads, for example, 2, 3, 5 or the like.

At 340, system may block the user from downloading the requested digital content due to the number of concurrent downloads. In some cases, the user may receive a prompt or message stating the due to the ongoing downloads the user is requested to wait until at least one download finishes before requesting another download of the digital content. In other cases, the user may be returned to the catalogue of available digital content and may only be notified that the download failed.

Limiting the number of concurrent downloads is also intended to reduce the number of illegitimate downloads occurring on a user's account. In an example, the user may purchase the digital content and then provide the user id and secure login information to other users, or have the user id and secure login information hacked by other users. Other users may be able to download the digital content and may attempt to do so at the same time. In some cases, if the user is blocked, the user may be required to wait for a preset condition to be satisfied before proceeding, for example, waiting for a download to be completed, waiting for predetermined time interval, or the like prior to requesting another download. In some cases, the predetermined time interval may be, for example 30 seconds 1 minute, 5 minutes, or the like. In some cases, the predetermined time interval may be adjusted depending on the number of downloads being attempted simultaneously. The more simultaneous attempts to download the digital content, the longer the predetermined time interval the user must wait prior to providing a new download request. By including a time interval, it is intended that the fraudulent users may be dissuaded or discouraged from downloading the digital content.

At 350, if the user's current downloads including the download of the requested digital content are below the predetermined download threshold, the user will receive a ticket indicating the download will progress shortly. The content review module 200 retrieves the digital content and the associated DRM and is further configured to encrypt the digital content. In some cases, the content review module 200 will transmit the digital content and associated DRM to another network device or third party server for encryption.

At 360, the revoker module 210 determines the access rights and previously authorized devices associated with the digital content, for example, the number of user devices that have previously downloaded the digital content and in which the content has not been revoked. The revoker module 210 further reviews the DRM to determine the access rights associated with the digital content, for example, the number of simultaneous authorized devices the user is permitted. If the user has not exhausted the access rights, the revoker module 210 is configured to allow the download to proceed.

At 370, if the revoker module 210 determines that the user has exhausted the access rights. If the requested download will result in more authorized devices hosting the digital content than the access rights allow, the revoker module 210 will send a revoke notification or message to at least one of the previously authorized devices currently hosting a downloaded copy of the digital content.

The revoker module 210 may determine which previously authorized user device to revoke the digital content by reviewing at least one use factors, for example, time the digital content was downloaded, last access of the digital content, time spent using the digital content, frequency the digital content is accessed, or the like. In some cases, only a single use factor may be reviewed, for example, the revoker module 210 may determine to revoke the user device which has the oldest download request and revoke the digital content from that device. In other cases, the revoker module 210 will review a plurality of use factors and determine which previously authorized user device is least likely to be used to review the digital content in the future or which device has been used the least in the past and revoke that device. In other cases, the revoker module 210 may request user input to determine which device should be revoked. The revoker module 210 may determine that the digital content needs to be removed from at least one of a plurality of previously authorized devices and may list the plurality of user devices and the user may select which device to revoke.

At 380, the user may experience a delay or a progress screen which is intended to allow time for the digital content to be encrypted. The digital content may be retrieved from publishers and hosted on, for example, third party servers, the learning management system, or the like, and is generally protected so that no unauthorized user can obtain access to the digital content. One way to protect the content is to encrypt the digital content for each user. The encryption key may be a one-time use key. Possible encryption schemes are described in Table 1, below, although those skilled in the art may be aware of further schemes, or may combine the schemes described below. Even with the digital content being encrypted, there may still be possibility that a rogue or fraudulent user may obtain the decryption key on the user or user's device, for example, jailbroken iPad, rooted Android, web client through javascript inspection, or the like.

TABLE 1

Encryption Schemes

| Name | Description | Pros and Cons |
|---|---|---|
| Custom Encryption | Using an encryption algorithm such as Advanced Encyption Standard (AES) to encrypt an entire PDF document. User device downloads the entire encrypted document, decrypts, then renders the PDF document. | can be encrypted in real-time with very good server side performance web client cannot decrypt the entire file in memory. iOS client takes a while to decrypt the file. However, because of memory constraints, the decrypted file is saved to memory before sending to the renderer. This leaves plaintext file on disk |
| Custom Encryption with Portioning | Divide PDF into portions, and then use an encryption such as AES to encrypt the portions. | Encryption can be done in real-time. Portioning needs to be done at content ingestion time table of contents will be broken annotations are page-specific, and therefore needs to be reconstructed and saved properly by the client full text search is broken, would require server to generate indexing |
| PDF Native Encryption | Use PDF password protection, which encrypts objects inside the PDF file. This is part of the PDF spec. Available encryption algorithms include RC4 up to 128-bit and AES up to 256-bit. | password protected PDFs are secure can be loaded directly into rendering library, and decryption happens on-the-fly bookmarks, annotations, full text search, are all preserved PDF specific encryption, i.e. to encrypt other file types, new mechanism is required. |

As the user waits, the system 100 encrypts the digital content the user has requested.

At 390, the download of the encrypted digital content is requested by the network device 120 to download the digital content to the user device.

At 400, the download status is checked. In some cases, the system 100 will be determined that the encryption has yet to finish, and the user will be returned to wait for a further predetermined interval of time before the download is re-requested to provide time for the encryption to finish. In other cases, the system 100 may determine that a non-downloadable condition has occurred, for example, the content does not exist, the content failed to encrypt, another error has occurred, the user is no longer connected, or the like. In some cases, for example, if the user session connection may time out, the user may need to re-login. The user may be returned to the catalogue to request a further download or be redirected to similar content to download, if a non-downloadable condition has occurred.

At 410, in still other cases, the user device will be redirected to receive the content from a third party server 240 or third party content host. The user device may download the content from the network device, if the content is located there, or the user device may receive the content from a third party server after being directed to the server by the content review module 200 of the network device 120.

At 420, the encrypted content is saved to the memory module 170 of the user's device.

At 430, the user may be notified when the download is complete and the user can access the digital content on the user device.

In an example, the processing module 230 may load the entire digital content prior to encrypting the digital content to ensure the entire digital content is encrypted. Various libraries may be used, for example:
  i. Aspose;
  ii. EO pdf;
  iii. iText;
  iv. Docotic;
  v. Apache PDFBox;
  vi. PDFSecure;
  vii. Etc.

In some cases, the digital content may allow for a plurality of downloads while other digital content may only allow for the user to have the content on a single authorized device. The specific digital content may also allow for a different access rights depending on the user data. For example, a professor may be able to have specific digital content on three authorized user devices, while a student may be limited to a single authorized device for the same digital content.

Figure 5:
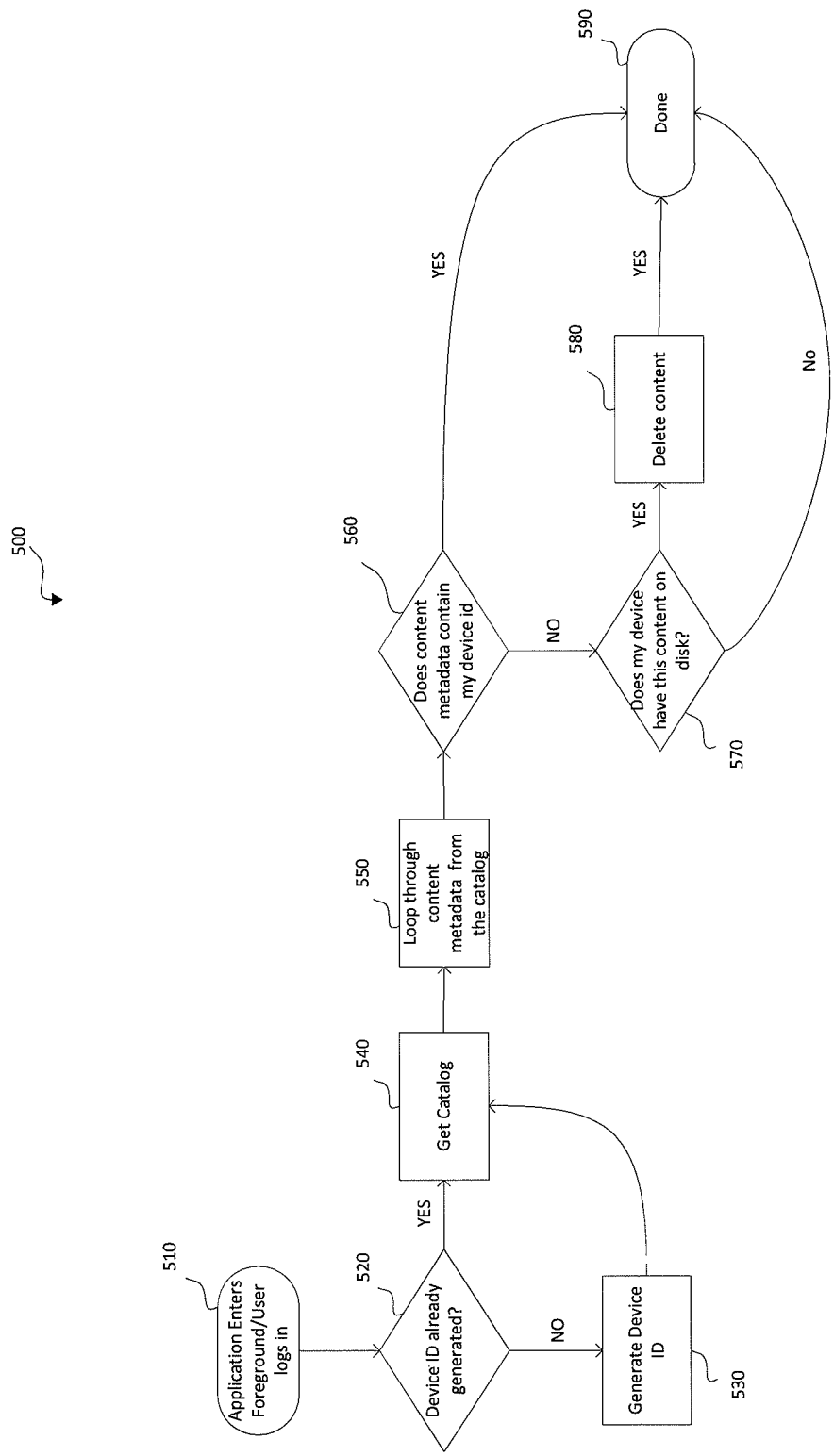
FIG. 5 is a flowchart illustrating content removal from a device according to an example embodiment.

FIG. 5 illustrates a method 500 for content removal from a user device according to an example embodiment.

At 510, the user logs into or otherwise accesses the system 100.

At 520, the system 100 retrieves the device has a device identifier or device ID.

At 530, if the device does not have a device ID, the user device generates a unique device ID for the user's device. In some cases, the device ID will be associated with the user data and or user identification.

At 540, the enforcement module 160 determines a catalogue of available digital content for the user by reviewing the digital content stored in the memory module 170 of the user device. The enforcement module 160 may further be in communication with the content review module 200 to determine other digital content available to the user.

At 550, the enforcement module 160 further reviews metadata related to the digital content of the catalogue and the user. In some cases, the metadata will be stored locally in the memory module 170. In other cases, the enforcement module 160 may retrieve the metadata from the network device 120. In other case, the metadata may be transmitted to the previously authorized user devices, when the user requests a download of digital content on a different user device.

At 560, the enforcement module 160 determines if any of the metadata requiring digital content to be revoked is associated with the device ID. In some cases, the metadata may specifically list device ID's to be revoked. In other case, the metadata may only list device IDs which are authorized devices permitted to have downloaded copies of the digital content.

At 570, the enforcement module 160 will review whether the user device contains content that needs to be revoked and deleted. In some cases, the enforcement module 160 will determine the device has digital content but the device ID is not listed as a permitted device.

At 580, the enforcement module 160 will delete or otherwise remove the content. In some cases, the enforcement module 160 may remove the decryption key as opposed to deleting the content. Removing the key may revoke access to the user on the user device but is intended to allow for access to be reinstated more quickly. If the user requests access to a revoked but previously authorized user device, the user may simply require the key and not be required to download the digital content again. Downloading the key is intended to be quicker and require less bandwidth than downloading the digital content. Removing the key may be preferred by users that may have downloading quotas or caps.

At 590, the display module 150 displays the catalogue for the user and the user can select digital content to review.

In some cases, the user may already be logged in or otherwise accessing the system 100 when the user device receives metadata stating that the device is revoked in relation to the digital content. The user device, for example an android tablet, may be set to receive updates even if the user is not currently using the application to view the digital content, or not using the user device at the time of the update. In this case, the enforcement module 170 may delete or otherwise revoke the content in the background, without the user accessing the catalogue of data.

In some cases, the metadata may be pushed to the device from the network device at predetermined intervals, for example, every 5 minutes, every 30 minutes, every download request by a user, every completed download by a user, or the like. In other cases, the user device may periodically ping the network device for updates to the metadata, for example, every time the user logs in, every 30 minutes, once a day, or the like.

In some cases, if the user device to be revoked is not connected to the network, the digital content may not be revoked until the user connects the device. This scenario may allow the user to temporarily have more than the maximum number of authorized devices hosting the digital content. As such, when the user attempts to access the digital content on a device not connected to the network, the user may receive a prompt requesting the user to connect the device prior to accessing the digital content.

In other cases, the user may be requested to connect a previously authorized device to the network if it is determined that the device has received a revoke message but has not yet connected to the system 100. For example, a user may request to download digital content on a user device. The system 100 determines that a previous revoke message relating to the selected digital content or to other digital content has been sent, but the authorized device has not yet revoked the digital content. The user may be requested to connect the authorized device to the network prior to being permitted to download the selected digital content.

Table 2 illustrates an example of determining content catalogue for a user, wherein the device ID's listed are device ID's allowed to access the digital content. The example is provided for illustrative purposes only and one skilled in the art will understand that there is a plurality of ways to determine whether a user device continues to have access to digital content or if the content should be deleted.

TABLE 2

| | | Determining content catalogue | | |
|---|---|---|---|---|
| Service End Point | <URL>/content | | | |
| HTTP Method | GET | | | |
| Request Parameters | showall | | OPTIONAL | Set to "true" to return all content regardless of transcode state and "false" to return only content which has completed transcoding. The default is "false". |
| | synckey | | OPTIONAL | This property allows for incremental sync of content changes from the server. Default value is 0 which will perform a full sync and not return any records marked as deleted. Use the returned synckey value from previous content request to perform incremental sync |
| Response Data | Code | | | SUCCESS<br>FULL_SYNC_REQUIRED - resend request with synckey set to 0 and perform a full sync |
| | synckey | | | (Long) the current highest synckey for all records assigned to the user. This value can then be sent in to subsequent requests to perform an incremental sync |
| | data - Array of contents | | | |
| | Id | | | ID of the content |
| | Name | | | Name of the content |
| | Mime | | | MIME type of the content e.g. application/epub+zip |
| | description | | | Description of the content |
| | filename | | | Filename of the content |
| | Size | | | size of the content in bytes |
| | policy_expires | | | time of when the content expires. In seconds since 1970 |
| | prescriberid | | | ID of the user who assigned this content |
| | usertags | | | user-level tags on the content. Contains tag, and type. Type can be TEXT, SYSTEM. |
| | Read | | | Boolean |
| | archived | | | Boolean |

TABLE 2-continued

| Determining content catalogue | |
|---|---|
| favorite | Boolean |
| Isnew | Boolean |
| md5 | MD5 hash of the file |
| sourcecontentid | content id from the source |
| sourcecontentversion | content version from the source |
| transcodestate | 2 = not started, 1 = transcoding, 0 = success, −1 = failed. |
| deviceids | an array of device ids where the content is download to. If this array does not contain your device id and the content is on the device, remove this content from the device. |

Sample Response:
```
{
    "code": "SUCCESS",
    "synckey": 1357658177,
    "data": [
            {
            "id": "aeff3ae2-4a2c-4f48-ae55-757e2e186854",
            "name": "Objective-C",
            "mime": "application/pdf",
            "description": "A guide to objective-c for c++ developers",
            "filename": "cpp-objc-en.pdf",
            "size": 888248,
            "policy_expires": 4492590490,
            "prescriberid": "rivet_basicUSERID",
            "usertags": [
                    {
                    "tag": "c++",
                    "type": "TEXT"
                },
                    {
                    "tag": "objective-c",
                    "type": "TEXT"
                },
                    {
                    "tag": "guide",
                    "type": "TEXT"
                }
            ],
            deviceids: [{"id":" a448b1ef-7ef3-46d9-a768-cd3a30e27d12",
"dateadded": 1370054729},{ "id":" g418b3ef-7ef3-46d9-a718-
ba3a30e17d11", "dateadded": 1370054729}]
        },
            {
            "id": "d6f73587-8f38-43d5-bd83-b9279c843bc2",
            "name": "Key Out Of Time",
            "mime": "application/epub+zip",
            "filename": "key_out_of_time.epub",
            "size": 213639,
            "policy_expires": 4492590490,
            "prescriberid": "rivet_basicUSERID",
            "usertags": [ ]
        },
            {
            "id": "f408b3ef-7ef3-46d9-a768-cd3a30e27d12",
            "name": "Demo Feedback for Rivet Reader",
            "mime":     "application/vnd.openxmlformats-
officedocument.spreadsheetml.sheet",
            "description": "excel sheet for gathering feedback",
            "filename": "Demo Feedback Asks for RivetReader v1.0 -
061912.xlsx",
            "size": 16638,
            "author": "Aaron Stuart",
            "publisher": "D2L",
            "policy_expires": 4492590490,
            "prescriberid": "rivet_basicUSERID",
            "usertags": [ {
                "tag": "rivet",
                "type": "TEXT"
            }]
        }
    ]
}
```

| | |
|---|---|
| Scope Required | binder_consume_content |

In one example, a student accesses the system 100 via a user device, for example a tablet computer. The display module 110 displays a catalogue of available material to the student. The student wishes to download a textbook that the student has previously downloaded on his laptop computer and on his smart phone as the student plans to return home for the weekend and does not wish to bring the laptop computer with him. The student requests the download of the textbook to the tablet computer. The system 100 determines that the maximum number of authorized devices is two and to download the digital content on the tablet computer, the digital content will need to be revoked on either the laptop computer or mobile phone. The system 100 may review use factors and determine that the smart phone was the first to download the digital content and the digital content has been accesses more frequently, more recently and for longer intervals on the laptop computer. As such, the system 100 may determine to revoke the digital content on the smart phone. In some cases, the system 100 may review only a single use factor, for example, the first device to request the download may be revoked. In other cases, the system 100 may suggest a user device to revoke and may prompt the student to agree to the selection or to modify the selection. In still other cases, the student may be presented with a list of current devices hosting the digital content and the student selects which device to revoke. The system 100 then encrypts or provides for the encryption of the digital content and the tablet computer downloads the encrypted textbook. The digital content is revoked by deleting or otherwise removing the textbook from the smartphone or by deleting or otherwise removing the key to access the textbook.

In another example, the access rights may specify different maximum authorized devices depending on the device type. For example, the access rights may allow the user a single laptop or desktop computer to host the device, but may allow the user to have two handheld portable communication devices, for example two smartphones, or a smart phone and a tablet. The revoker module 210 may determine the type of device has been previously authorized to determine whether the user has exhausted the access rights. In some cases, the user may attempt to download the digital content on a type of device that has exhausted access rights. The revoker module 210 may revoke the previously authorized device of the same type or, prior to revoking the device may inform the user that although the user has exhausted the access rights with respect to this type of device, the user may still download the digital content on a separate type of device to see if the user would prefer to download the digital content on an the different type of device.

In yet another example, a user may download a component of the selected digital content. For example, the user may wish to download only a chapter of a textbook. The access rights may only allow a single authorized download but may allow the components to be downloaded on separate device. For example, if the student is accessing a textbook, the student may be select to download chapters 1 to 3 on a laptop. The student then may access the system 100 with a tablet computer and request the download of chapters 3 and 4 for the tablet device. The revoker module 210 may revoke chapter 3 from the laptop but may leave chapters 1 and 2 as the user has not requested to download those components of the selected digital content. After sending the revocation to the laptop with respect to chapter 3, the user may then download chapters 3 and 4 onto the tablet computer.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for digital rights enforcement over multiple devices, the method comprising:
 receiving, by a server, a request for digital content from a user via a selected user device over a network;
 determining the digital content requested by the user;
 determining digital rights associated with the digital content;
 determining access rights relating to authorized devices for the user based at least in part on the digital rights associated with the digital content;
 determining whether the user has exhausted the access rights; and
 in response to determining the access rights are exhausted:
  determining at least one content use factor for each of previously authorized user devices of the user, wherein the at least one content use factor includes one or more of a time since the digital content was downloaded on the previously authorized user devices, a time since content corresponding to the digital content was last reviewed on the previously authorized user devices, and a time spent reviewing the digital content on the previously authorized user devices;
  determining a previously authorized user device of the previously authorized user devices on which to revoke access to the digital content based on the at least one content use factor; and
  revoking the access rights to the previously authorized user device determined based on the at least one content use factor;

in response to determining the access rights are not exhausted, downloading the digital content on the selected user device.

2. The method of claim 1, wherein the revoking of the access rights to the previously authorized user device occurs automatically.

3. The method of claim 1, wherein the user is requested to approve selection of which previously authorized user device to revoke prior to the revoking of the access rights.

4. The method of claim 1, the at least one content use factor further comprises frequency of accessing the digital content on the previously authorized user devices.

5. The method of claim 1, further comprising:
determining a number of concurrent downloads requested by the user after determining the digital content requested by the user; and
in response to determining the number of concurrent downloads is above a predetermined threshold, waiting for a preset condition to be satisfied before proceeding.

6. The method of claim 5, wherein the preset condition is an expiry of a predetermined time interval.

7. The method of claim 1, further comprising:
encrypting the digital content prior to downloading the digital content on the selected user device.

8. The method of claim 7, wherein the encrypting of the digital content occurs contemporaneous to the request for the digital content.

9. The method of claim 1, further comprising:
displaying a catalogue of available digital content to the user prior to determining the digital content requested by the user.

10. The method of claim 9, wherein the displaying of the catalogue comprises:
determining user data related to the user; and
determining catalogue content from a learning management system based on the user data.

11. The method of claim 1, wherein the revoking of the access rights comprises deleting the digital content from the previously authorized user device.

12. The method of claim 1, wherein the revoking of the access rights comprises deleting a decryption key from the previously authorized user device.

13. The method of claim 1, wherein the revoking of the access rights comprises:
monitoring for connection of the previously authorized user device to a network; and
sending a signal revoking the access rights of the previously authorized user device to the previously authorized user device to revoke access to the digital content.

14. The method of claim 1, further comprising:
determining a user identification; and
determining access rights relating to authorized devices for the user based at least in part on the user identification.

15. The method of claim 14, wherein the user identification identifies the user as either a student or instructor and the determining of the access rights relating to the authorized devices for the user based at least in part on the user identification further comprises determining a course related to the digital content.

16. The method of claim 1, wherein the determining of the access rights comprises determining a role of the user in relation to a learning management system, wherein the access rights are determined based at least in part on access rights corresponding to digital content for the role.

17. The method of claim 1, wherein the determining of the access rights comprises determining access rights for a plurality of components constituting the digital content.

18. A system for digital rights enforcement over multiple devices, the system comprising:
at least one processor configured to:
receive a request for digital content from a user via a selected user device over a network;
determine the digital content requested by the user via the selected user device; and
determine digital rights associated with the digital content; and
determine access rights relating to authorized devices for the user based at least in part on the digital rights associated with the digital content;
determine whether the user has exhausted the access rights; and
in response to determining the access rights are exhausted:
determine at least one content use factor for each of previously authorized user devices of the user, wherein the at least one content use factor includes one or more of a time since the digital content was downloaded on the previously authorized user devices, a time since content corresponding to the digital content was last reviewed on the previously authorized user devices, and a time spent reviewing the digital content on the previously authorized user devices;
determine a previously authorized user device of the previously authorized user devices on which to revoke access to the digital content based on the at least one content use factor; and
send a revoke message to revoke the access rights to the previously authorized user device determined based on the at least one content use factor;
in response to determining the access rights are not exhausted, allow downloading of the digital content on the selected user device; and
a memory coupled to the at least one processor and configured to provide the at least one processor with instructions.

19. The system of claim 18, wherein the at least one processor is further configured to provide a prompt to the user wherein the user is requested to approve selection of which previously authorized user device to revoke prior to the revoking of the access rights.

20. The system of claim 18, wherein the at least one content use factor further comprises frequency of accessing the digital content on the previously authorized user devices.

21. The system of claim 18, wherein the at least one processor is further configured to:
determine a number of concurrent downloads requested by the user after determining the digital content requested by the user; and
in response to determining the number of concurrent downloads is above a predetermined threshold, wait a predetermined time interval before proceeding.

22. The system of claim 18, wherein the at least one processor is further configured to:
encrypt the digital content prior to downloading the digital content on the selected user device.

23. The system of claim 18 further comprising:
a display module configured to display a catalogue of available digital content to the user.

24. The system of claim 18, wherein the at least one processor is configured to revoke the access rights by deleting the digital content from the previously authorized user device.

25. The system of 16 wherein the at least one processor is configured to revoke the access rights by deleting a decryption key from the previously authorized user device.

* * * * *